Figure 3:
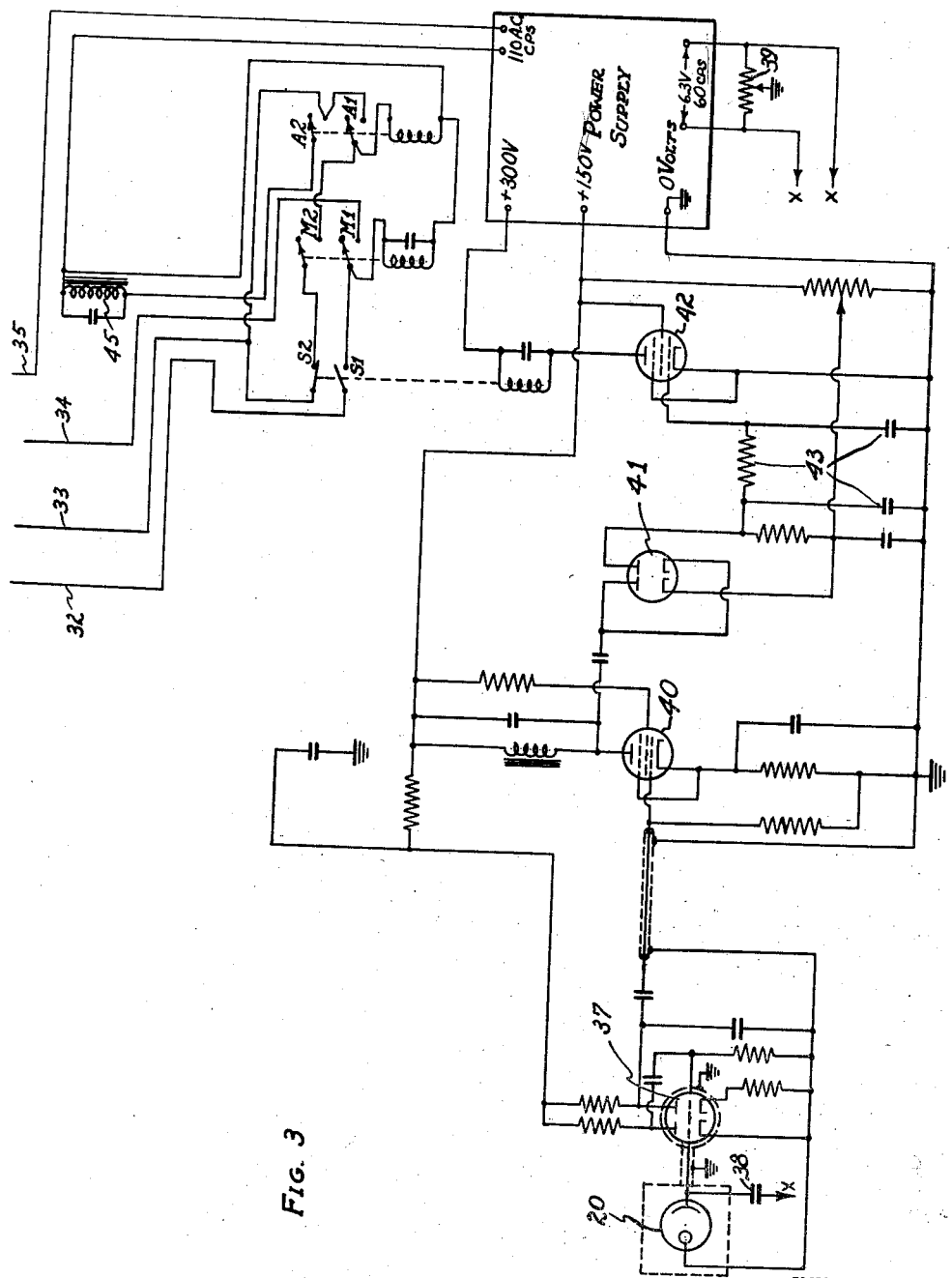

Oct. 23, 1956
J. C. FROMMER
2,767,839
COUNTERCHECKING CIRCUIT AND DEVICE
Filed June 7, 1952
2 Sheets-Sheet 1
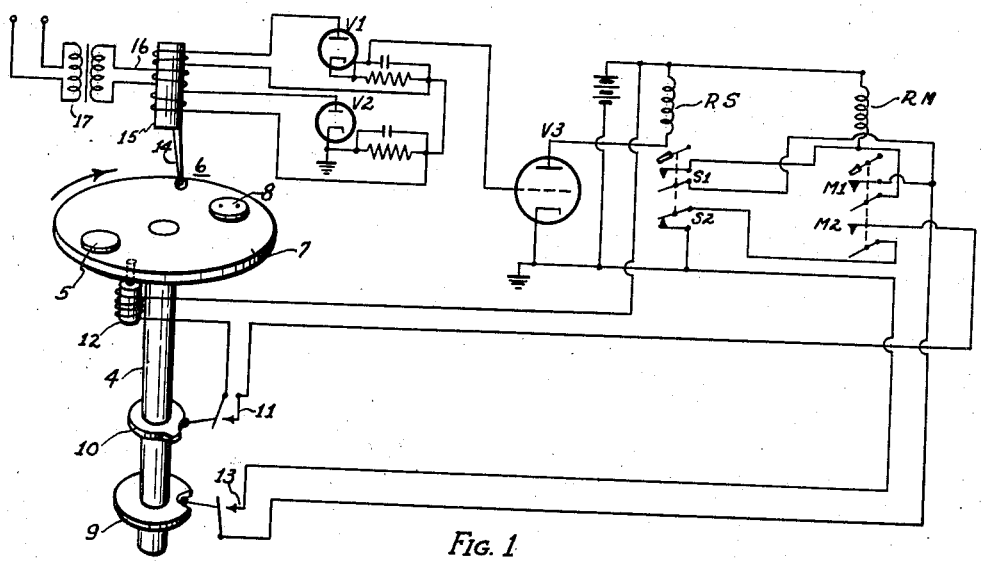
Fig. 1
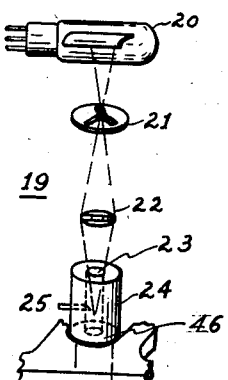
Fig. 2
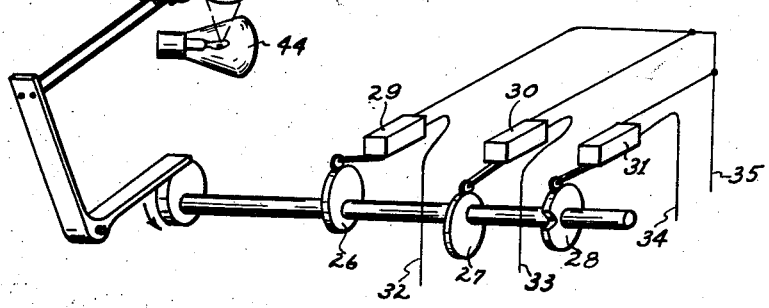
INVENTOR.
JOSEPH C. FROMMER
BY Kenneth Swartwood
ATTORNEY Oct. 23, 1956    J. C. FROMMER    2,767,839
COUNTERCHECKING CIRCUIT AND DEVICE
Filed June 7, 1952    2 Sheets-Sheet 2

INVENTOR.
JOSEPH C. FROMMER
BY Kenneth Swartwood
ATTORNEY

United States Patent Office 2,767,839
Patented Oct. 23, 1956

2,767,839

COUNTERCHECKING CIRCUIT AND DEVICE

Joseph C. Frommer, Cincinnati, Ohio, assignor to Electric Eye Equipment Company, Danville, Ill., a corporation of Delaware Application June 7, 1952, Serial No. 292,365

5 Claims. (Cl. 209—74)

This invention relates to an improved circuit and method for inspecting articles.

In electrical or electronic inspection of parts, substances or the like, it is important that failure or misadjustment of the apparatus must never result in an acceptance where rejection would be obtained under proper operating conditions. In such cases, it is desirable to so design the apparatus that failure in its proper functioning will under all conditions result in rejection of the item undergoing inspection.

As an example, when vacuum tubes are used, it is advisable to design the circuits so that the vacuum tubes draw current to initiate acceptance of the item undergoing inspection. With such an arrangement, a burned out vacuum tube will cause rejection under all conditions. However, when the circuit gets involved and complicated, or when multistage amplification is used, it is difficult to fulfill this requirement in all stages. Also, even though the most frequent failure of vacuum tubes is burn-out, they may also fail due to traces of gas inside the envelope, which usually causes the tube to draw current despite a grid signal that would cut off the current in a good tube.

In other instances, continued use or ageing may cause a change in the value of various circuit components, such as resistors, condensers, etc.; so that without the apparatus being actually inoperative, the point at which rejection occurs may shift. It is thus impossible to select all components so that drift in any of them will always cause the apparatus to drift toward rejection rather than toward acceptance.

It is, therefore, an object of this invention to provide an inspection device so constructed and operated that it will reject any article which should be rejected regardless of any type of failure which may occur in the circuit.

In a broad sense the invention involves a method and device in which the apparatus is exposed once to the piece or condition to be inspected, and once to a piece or condition under which there would be a rejection if the apparatus were in good working order. The apparatus and circuit is then so designed and constructed that actual acceptance of the article undergoing inspection will only occur after its sensing elements detect acceptability in the piece to be classified and detect unacceptability in a piece known to be unacceptable.

This principle may be carried out in a simple embodiment in which the checking under conditions which should cause rejection, (referred to hereinafter as "counterchecking") occurs by some simple simulation of conditions under which an apparatus with no failure in its parts would reject. In another embodiment of the invention it may inspect a "no-go" gage before or after the inspection of each piece to be tested. In the first mentioned embodiment protection is provided against the complete failure of components, as in the case of a burned-out or gassy tube. In the second embodiment constant checking against shifting of the acceptance point is accomplished.

This invention can be further understood by referring to the drawings in which Figure 1 illustrates schematically a simplified circuit and inspection device for checking an object which must be at least equal to a given minimum dimension; Figure 2 illustrates a device for inspecting a piece for the presence of a pin projecting laterally into a hole while rotating; Figure 3 illustrates schematically a circuit for use in connection with the device of Figure 2.

The machine shown in Figure 1 inspects a piece to determine if it is as thick or thicker than a given minimum dimension. A magnetic feeler 14 attached to a core 15 having energizing coil 16 connected to power supply 17 is provided in the path of the part to be checked for thickness. If the part is of the prescribed minimum thickness it will cause the feeler to rise to a height such that the resulting increased positive potential on the grid of vacuum tube (V3) will make the tube conduct enough current to close the signal relay (RS). This follows because the elevation of the feeler changes the magnetic field associated with the core 15 sufficiently to cause a change in the magnetic flux through its windings. As a result there is a surge in the conductors led to diodes V1, V2. The diodes are connected to pass only the positive swings of the surge to the grid of tube V3.

If the thickness of the piece being inspected is less than the specified minimum, the voltage appearing at the grid of the vacuum tube (V3) does not start tube conduction. The signal relay (RS) of this apparatus will fail to operate and hence will reject if the vacuum tube V3 burns out, but it will accept all pieces (good and bad alike) if the vacuum tube V3 becomes gassy or if the sensitivity of the magnetic feeler drops to zero. To prevent acceptance in such cases, the arrangement of the invention, described hereinafter is used.

A rotating shaft 4 having attached thereto disc 7 brings the piece 5 under test into an inspection zone 6 (i. e. under the magnetic feeler), and later it brings a "no-go" gage 8 into the same inspection zone. Shaft 4 has two cams, 9 and 10, cam 9 being a release cam which closes switch 13 for the entire revolution of the shaft excepting a short period before the start of each inspection. The other cam 10 (accept cam) keeps the pair of contacts 11 closed for only the period in which the "no-go" gage 8 is in the inspection zone 6. The "signal relay" RS, as described, is arranged to be energized by the signal from the vacuum tube V3 which results in closing of contacts S1 and opening of contacts S2. Energization of solenoid 12 causes the apparatus to finally accept the inspected piece. Between relay RS and solenoid 12 there is connected a "memory relay" RM, having contacts M1 and M2. In the starting position of the shaft (as shown in the drawing) both cams 9 and 10 cause the respective switches 11 and 13 to be open. After about 120° of rotation, the piece 5 under test passes into the inspection zone 6. The release cam switch 13 will then have made contact but the accept cam switch 11 will still be open. If the piece under inspection is of proper thickness or greater, the vacuum tube V3 will energize the signal relay RS. S1 contacts will then energize the memory relay RM, and holding contacts M1 on the memory relay will keep this memory relay energized until the release cam switch 13 opens the circuit at the end of the entire inspection. Before this occurs, the "no-go" gage 8 moves into the inspection zone 6. If the sensing element comprising tubes V1, V2, V3 and the signal relay RS rejects this "no-go" gage (that is, relay RS is not energized), as it is supposed to do, contact S2 remains closed. At the same time cam 10 closes switch 11 and energizes the accepting solenoid 12 through contacts S2, M2.

If the piece 5 under inspection had not been accepted by the signal relay RS, the memory relay would have remained open and the solenoid 12 could not have been energized. If the signal relay had accepted the "no-go" gage 8, and become energized, contacts S2 would be open during the entire period in which the accept cam 10 keeps the power supply to S2 closed, and the solenoid 12 could also not be energized. Thus the solenoid 12 will be energized to accept, when and only when the signal relay has both accepted the piece 5 under test and rejected the "no-go" gage 8.

As previously mentioned, it is not necessary to use a "no-go" gage as a counter-check. If it is not desired to check the setting of the amplifier but only necessary to make sure that the magnetic feeler and the vacuum tubes are all satisfactorily operative it will suffice to omit the "no-go" gage 8. When the surface of the table 7 where the "no-go" gage was located now passes through the inspection zone 6, the feeler will always be below the thickness specified and the relay RS will be in "reject" condition, i. e. not energized, unless the magnetic feeler is inoperative or the vacuum tube V3 gassy. If the operating point of the amplifier should shift to give false acceptance of a test piece 5 whose thickness is less than specified, this would not be discovered without the "no-go" gage 8 which under such circumstance, is needed to give an "accept" signal to energize relay RS and thus prevent operation of the piece acceptance solenoid 12.

The above example applies to inspection to reject pieces which fall below a designated thickness. If it is desired to inspect for the rejection of pieces above a specified thickness a similar circuit may be used by interchanging contacts S1, S2. Then an acceptable piece will not energize the signal relay RS, the contacts S2 will lock in the memory relay RM and the "no-go" piece will cause the signal relay RS to become energized and to energize the solenoid 12 through the locked-in memory relay. If only protection against component failure is desired, and no protection is needed against shifting of the acceptance point, then, for this arrangement, the "no-go" piece may be replaced by using a rotating table having a part which passes under feeler 14 after the inspected part and protrudes above an acceptable piece.

The positioning table 7, being on one shaft with the cams, illustrates one device for accomplishing the objects of my invention. In another embodiment the piece under inspection and the "no-go" gage could be held in the inspection zone for some time. Structure for protecting the apparatus against acceptance signals, during the periods in which neither the piece to be inspected nor the "no-go" gage are in the inspection zone, with the aid of magnetic shields, cams, etc. is not shown but will be obvious to those versed in the art.

To further illustrate my invention, Figure 2 is a perspective drawing and Figure 3 is a circuit diagram of the pertinent parts of a machine which utilizes this counterchecking circuit without the use of a "no-go" gage. In this device, means are provided for inspecting an article for the presence of a pin projecting laterally into a hole while rotating. The axis of this hole is also the axis of rotation of the piece when in the inspection position. (See Figure 2.) If a pin projects into the hole in the piece, the piece is to be rejected, and if the hole is unobstructed the piece is to be accepted.

Referring to Figure 2 there is provided an optical system 19 comprising a light source 44 and lens 45 for directing light through opening 23 in article 24 in the inspection zone 46. The light leaving opening 23 passes through lens 22 and shield 21 onto phototube 20.

If the pin 25 is projecting into the hole 23 through the article 24 during the inspection period the pin will periodically interrupt that part of a beam of light passing through the hole which is defined by shield 21, thereby causing the phototube 20 to present an A. C. signal to the grid of tube 37 (see Figure 3). If there is no pin projecting into the hole through the piece there will be no change in the light beam reaching the phototube and consequently no A. C. signal will be presented to tube 37.

A positioning mechanism (not shown) moves the articles in and out of the inspection zone periodically, and geared directly to this mechanism are three cams 26, 27 and 28. Cams 26, 27 and 28 operate switches 29, 30 and 31 having respectively leads 32, 33, 34 and 35 (shown both in Figures 2 and 3). The reset cam 28 and its associated switch are so constructed that the switch contacts are open only for a very short period just prior to the arrival of a piece in the inspection zone. The inspect cam 26 and its associated switch are so constructed that the switch contacts are closed during the time the piece is in the inspection zone. The accept cam 27 and its associated switch are so constructed that the switch contacts are closed during the time the piece is being moved into the next (sorting) position except for a very short period near the end of this movement when the reset cam 26 opens its associated switch contacts.

As the pieces are moved in and out of the inspection zone there is a vane 36 which interrupts the beam of light reaching the phototube thereby cutting off all light reaching the phototube 20 during this part of the cycle. When this vane has cut off all light from reaching the phototube the impedance from the first grid of tube 37 to ground is increased to such a degree that it becomes sensitive to the A. C. signal intentionally introduced into this circuit through condenser 38. This effect has been explained in U. S. Patent #2,517,554. The amount of this A. C. signal can be controlled by the adjustment of potentiometer 39. If this A C. signal is adjusted to be of sufficient amplitude it appears to the grid of tube 40 as if a "no-go" or reject part were in the inspection zone.

When an acceptable piece is moved into the inspection position the grid of tube 40 receives no A. C. signal during the time the inspection cam holds its associated switch contacts closed, therefore tube 42 conducts current through the signal relay coil and closes contacts S1 which in turn energizes the coil of the memory relay which closes contacts M1 and M2. The memory relay is held closed through contacts M1 until its coil circuit is opened by the opening of the switch contacts associated with the reset cam. This occurs just before another piece has reached the inspection position. When the piece is moved out of the inspection position the vane interrupts the light beam and no light reaches the phototube and, as explained before an injected A. C. signal appears on the grid of tube 40. This signal is amplified by tube 40, rectified by tube 41, filtered by filter 43, and appears as a negative D. C. voltage on the grid of tube 42. This negative voltage causes tube 42 to cease conducting and the signal relay coil is de-energized thus closing contacts S2. At the same time the vane interrupts the light beam to the phototube (tube 20) the accept cam closes its associated switch contacts. The actuating relay coil is at this time energized through the closed accept cam switch contacts, the closed contacts S2 on the signal relay and the closed contacts M2 on the memory relay. This closes the actuating relay contacts A2 and thus actuates the solenoid 45 causing the piece to be accepted.

If a no-go or reject piece is moved into the inspection zone the presence of a pin projecting into the hole when the piece is spinning causes an A. C. signal to appear at the grid of tube 40. This signal is amplified, rectified, and filtered as in the case of the A. C. which appears at this tube when the light beam is interrupted. This signal appears at the grid of tube 42 as a negative D. C. voltage causing tube 42 to cease conducting and consequently contacts S1 on the signal relay are not closed, hence the memory relay is not energized, and the actuating relay cannot operate the solenoid to accept the piece.

If there is a failure of an amplifier component or a drift of circuit components which would tend to make the signal relay accept bad pieces, the acceptance of a bad piece is prevented because during the time in the positioning cycle when the vane interrupts the light the signal relay would not de-energize (close contacts S2) therefore the actuating relay could not close and actuate the solenoid to accept the piece.

I claim:

1. A device for inspecting a physical characteristic of an article, said device comprising article positioning means for bringing the article to be tested into an inspection zone, controllable acceptance elements actuatable between two conditions in one of which they accept the article in the inspection zone and in the other of which they reject it, sensing means responsive to said physical characteristic of the article when said article is in the inspection zone for controlling the actuation of the acceptance means, comparing means connected to subject the sensing means to conditions calling for rejection when the sensing means is in proper working condition, and an operating circuit connecting the sensing means with the acceptance elements to cause the acceptance elements to accept the inspected article only when the sensing means indicates acceptance of the article and rejection of the comparing means.

2. The combination of claim 1 in which the comparing means is connected to subject the sensing means to electrical conditions simulating the presence in the inspection zone of an article that should be rejected.

3. The combination of claim 1 in which the operating circuit includes a holding relay for storing a signal from the sensing means and an acceptance-elements-actuating connection through said relay and said sensing means.

4. The combination of claim 3 in which the operating circuit also includes synchronizing mechanism connecting the holding relay in the operating circuit during inspections and automatically unlocking this relay between inspections.

5. A device for inspecting a physical characteristic of an article, said device comprising article positioning means for bringing the article to be tested into an inspection zone, controllable acceptance elements actuatable between two conditions in one of which they accept the article in the inspection zone and in the other of which they reject it, sensing means responsive to said physical characteristic of the article when said article is in the inspection zone for controlling the actuation of the acceptance means, comparing means connected to introduce into the inspection zone a no-go gage, and an operating circuit connecting the sensing means with the acceptance elements to cause the acceptance elements to accept the inspected article only when the sensing means indicates acceptance of the article and rejection of the no-go gage.

References Cited in the file of this patent

UNITED STATES PATENTS

| | | |
|---|---|---|
| 2,280,948 | Gulliksen | Apr. 28, 1942 |
| 2,395,482 | Hurley | Feb. 26, 1946 |
| 2,415,174 | Hurley | Feb. 4, 1947 |
| 2,439,490 | Schell | Apr. 13, 1948 |
| 2,517,554 | Frommer | Aug. 8, 1950 |
| 2,570,288 | Todd | Oct. 9, 1051 |